United States Patent [19]

Kaelin

[11] 4,179,366
[45] Dec. 18, 1979

[54] METHOD FOR THE BIOLOGICAL PURIFICATION OF EFFLUENT AND THE PLANT FOR CARRYING OUT THE PROCESS

[75] Inventor: Joseph R. Kaelin, Buochs, Switzerland

[73] Assignee: Union Carbide Corporation, New York, N.Y.

[21] Appl. No.: 930,136

[22] Filed: Aug. 2, 1978

Related U.S. Application Data

[63] Continuation of Ser. No. 745,567, Nov. 29, 1976, abandoned, which is a continuation of Ser. No. 585,572, Jun. 10, 1975, abandoned.

[30] Foreign Application Priority Data

Nov. 18, 1974 [CH] Switzerland ................. 15346/74

[51] Int. Cl.² .................................................. C02C 5/10
[52] U.S. Cl. .................................... 210/14; 210/15; 210/202
[58] Field of Search ............... 210/15, 221 R, 199, 210/219, 14, 220, 18, 142, 200-202, 175-179, 86, 104, 12, 252, 259, 195 R, 197 S; 261/91

[56] References Cited

U.S. PATENT DOCUMENTS

| | | | |
|---|---|---|---|
| 3,133,017 | 5/1964 | Lambeth | 210/220 |
| 3,208,734 | 9/1965 | Wood et al. | 261/91 |
| 3,382,981 | 5/1968 | Hampton | 210/142 |
| 3,470,092 | 9/1969 | Bernard | 210/15 |
| 3,497,066 | 2/1970 | Nicol | 210/220 |
| 3,523,889 | 8/1970 | Eis | 210/104 |
| 3,595,783 | 7/1971 | Pflanz et al. | 210/220 |
| 3,715,304 | 2/1973 | Hefermehl | 210/12 |

*Primary Examiner*—Benoît Castel
*Attorney, Agent, or Firm*—Steven J. Hultquist

[57] ABSTRACT

Effluent to be biologically purified is poured serially through three interconnected tanks with the first two tanks acting as activation tanks and the last tank acting as a post-clarification tank. After the concentration of activated sludge in the first tank has dropped to a predetermined value, the flow through the tanks is reversed so that the last tank, previously the post clarification tank, acts as one of the activation tank and the first tank, previously one of the activation tank, acts as the post clarification tank, while the middle tank continues to operate as the other of the activation tanks.

In one embodiment, an aerator is provided in each tank and the aerators in the first and last tanks are switched on or off depending upon the direction of flow of effluent. In another embodiment, two movable aerators are provided and are disposed in use, in those tanks which are acting for the time being as activation tanks.

3 Claims, 4 Drawing Figures

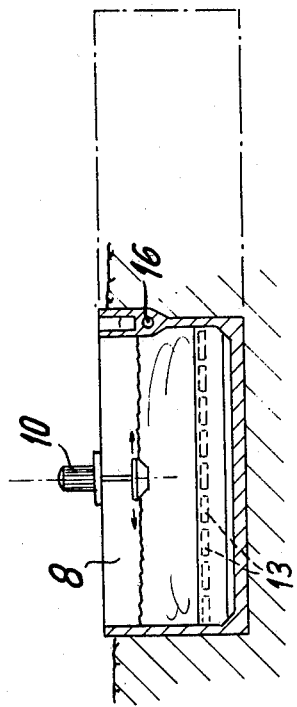
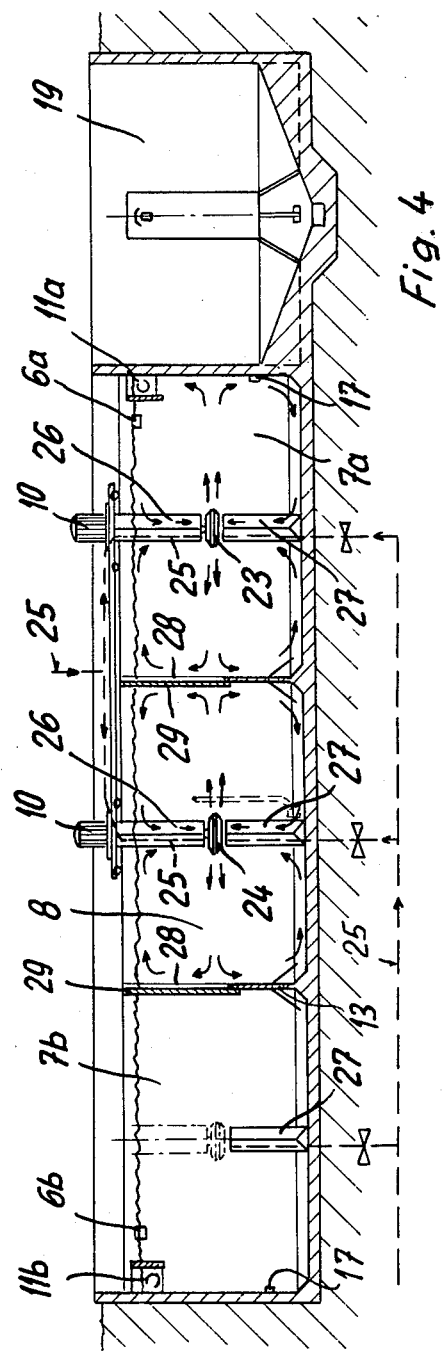

METHOD FOR THE BIOLOGICAL PURIFICATION OF EFFLUENT AND THE PLANT FOR CARRYING OUT THE PROCESS

This application is a continuation of my prior U.S. application Ser. No. 745,567 filed Nov. 29, 1976, now abandoned, which is a continuation of U.S. application Ser. No. 585,572 filed June 10, 1975, now abandoned.

This invention relates to a process for the biological purification of effluent and a plant for carrying out the process.

DESCRIPTION OF PRIOR ART

There is a known construction for clarifying plant with preclarification, activation and post clarification tanks. In recent years however a further step forward has been made which allows preclarification for the equivalent of approximately 10,000 inhabitants to be completely omitted.

It is also known that, in the case of a small clarifying plant, the effluent is purified in a single tank in which aeration, and after a given period of aeration, settling is allowed to take place in the same tank, whereby above the settled activated sludge a zone of clarified water exists from which a purified effluent is withdrawn by means of a pump. In a larger clarifying plant which possesses no preclarification and in which purification is carried out by means of activation and postclarification, there is the disadvantage in that either relatively deep sump has to be provided or expensive mechanical clearance equipment must collect the sludge and return it to the activating tank.

Attempts have been made to arrange two side-by-side tanks in such a way that they function alternately as aeration and post-clarification tanks. The aeration tank, which has the same dimensions as the post-clarification tank, in the next phase of the operation becomes the post-clarification tank: and the post-clarification tank in a subsequent operation, becomes the aeration tank. Both tanks have the same dimensions in order to permit reversal of the direction of operation. In practice, however, it so happens in most cases, that the volume of the post-clarifying tank should be about half the volume of the activating tank so that this technique using two tanks of similar size is not the optimum.

An object of the invention is to provide a method and a plant whereby, in the post-clarification tank, no mechanical sludge removal is necessary and in spite of this, no sludging occurs in the plant, and in which the volume of the aeration stage in both directions of operation of the plant is in the desired ratio to the substantially smaller volume of the post-clarifying stage.

BRIEF SUMMARY OF THE INVENTION

According to the present invention, there is provided a method for the biological purification of effluent, comprising the steps of feeding effluent to be purified successively to first and second tanks, acting as activation tanks, in a set of at least three interconnected tanks; introducing oxygen or an oxygen-containing mixture into the effluent in said first and second tanks; feeding, after a predetermined average residence time in said first and second tanks, the effluent from the second tank to a third tank of the set, said third tank being a clarification tank, withdrawing clarified effluent from the third tank until the concentration of activated sludge in the first tank is reduced to below a predetermined value; then reversing the flow of effluent through the set of tanks; and operating the third and second tanks as activation tanks and the first tank as a last post-clarification tank.

Where the tanks are particularly deep, for example, 6 to 12 meters deep, it is an advantage if the pure oxygen or oxygen mixture is introduced by means of a rotary device disposed below the surface of the effluent, preferably by a double-sided centrifugal pump impeller into which the effluent in the aeration tank is introduced, and at least one supply pipe for supplying oxygen or an oxygen-containing mixture to an inlet zone of the device.

In order to avoid accumulation of sludge on the floor of each activating tank, it is an advantage if the oxygen or oxygen-containing supply device causes an effluent flow rate directly above the bottom of the tank of at least 30 centimeters per second.

According to another aspect of the present invention, a plant for carrying out the method according to the invention, comprises a set of at least three interconnected tanks; at least two devices for the set for introducing oxygen or an oxygen-containing mixture into the effluent present in the activating tanks; associated with the tanks at each end of the set, controllable means for effluent supply and effluent removal; and a control arrangement for the controllable means and said at least two devices for changing the direction of flow through the sets so that, in one direction, two of the tanks at one end of the set act as activation tanks and a tank at the other end of the set acts as a post-clarification tank, whilst, in the opposite direction, two tanks at said other end of the set act as activating tanks and the tank at said one end of the set acts as a post-clarification tank.

In order to construct a compact plant, it is expedient for the tanks to be interconnected in end-to-end relationship, with dividing walls therebetween having openings therethrough.

In the case of a larger plant, constructional costs can be reduced by building several such triple tanks so that adjacent triple tanks have a common wall.

In order to obtain the smoothest possible flow, despite the highly turbulent condition of the effluent, to achieve an optimum post-clarification effect, it is expedient if the dividing wall between an activating tank and a post-clarification tank is provided, on at least one side thereof facing the tank acting intermittently as the post-clarification tank with a baffle which projects from above the opening in the wall downwardly and inwardly of the respective tank so as to overlap said opening.

It is a further advantage one of such baffles is provided on each side of the dividing wall. It is further advantageous if an oxygen or oxygen-containing mixture introducing device is provided in each tank, the devices in the end tanks being arranged, in use, to be operative or inoperative depending upon the direction of effluent flow through the tanks, and the device in the middle tank being arranged to be operated, in use, in both directions of flow of effluent through the tanks.

In order to reduce the number of the oxygen introducing devices and to reduce the resultant costs it can be an advantage if the tanks are disposed adjacent to each other with dividing walls therebetween having at least partially closable openings therethrough and two introducing devices are movable so as to be capable of passing through said openings.

BRIEF DESCRIPTION OF THE DRAWINGS

Embodiments of the present invention will now be described, by way of example, with reference to the accompanying drawings, in which:

FIG. 3 is a section on the line III—III in FIG. 2; and

FIG. 4 is a longitudinal section of another form of plant in accordance with the present invention.

DETAILED DESCRIPTION

Figure 1:
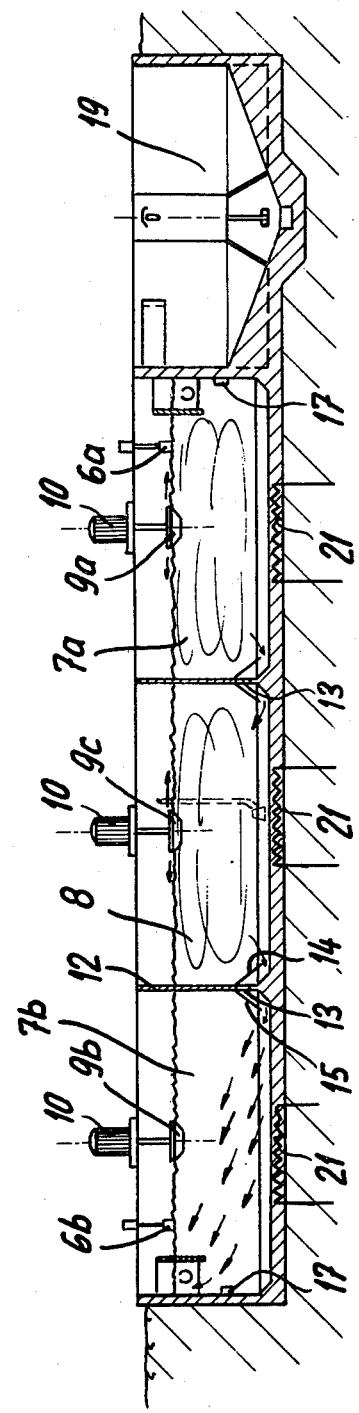
FIG. 1 is a longitudinal section, on line I—I of FIG. 2 of one embodiment of a plant according to the present invention.
Figure 2:
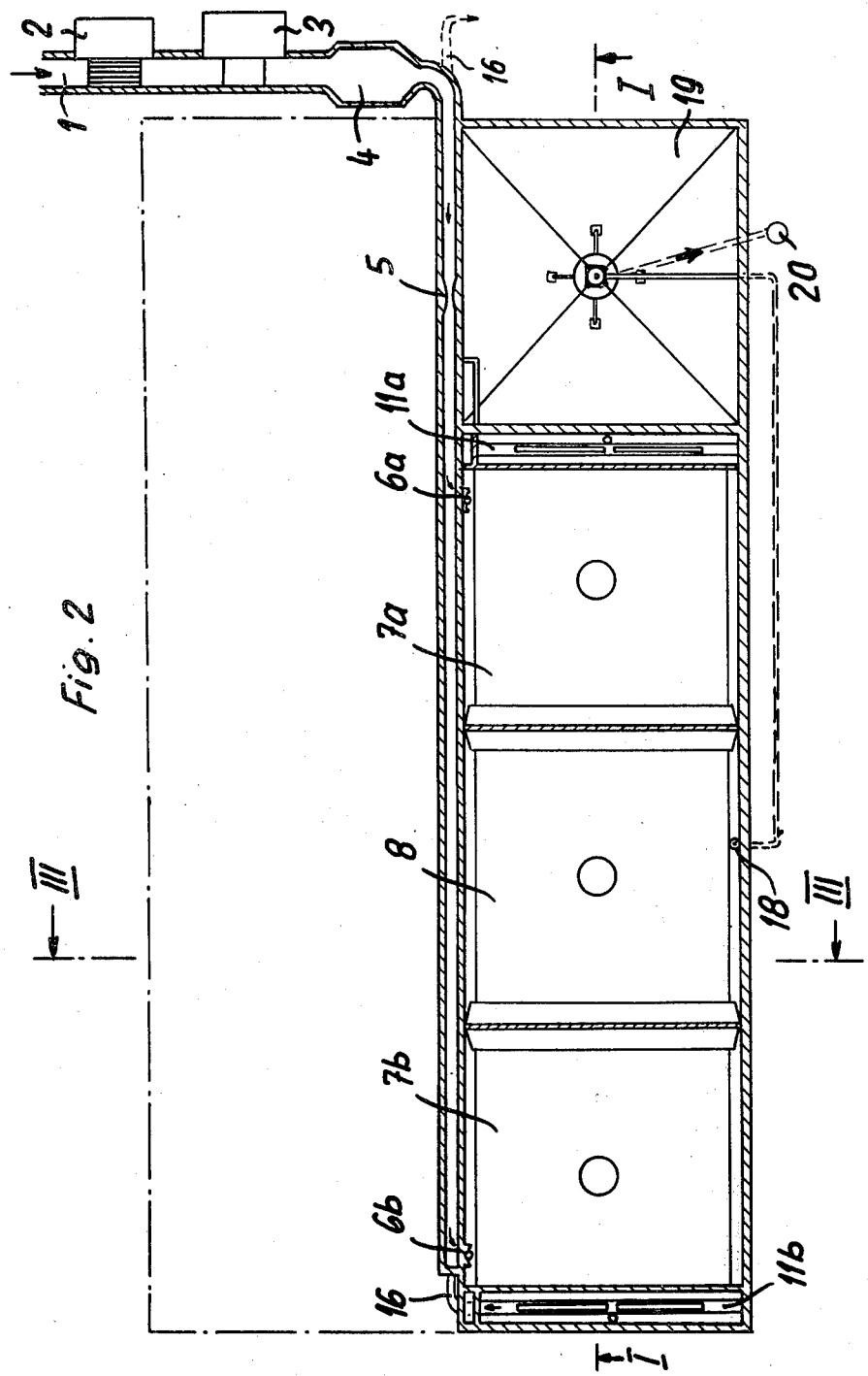
FIG. 2 is a plan view of the plant illustrated in FIG. 1.

With reference to FIGS. 1 to 3, effluent to be purified is fed via a delivery pipe 1, a tank 2, a sand trap 3, a coarse material crusher 4, followed by a water metering device 5 and one of two remote controlled supply valves 6a and 6b into one of two outer tanks 7a and 7b of a unit consisting of three tanks 7a, 7b and 8. If, for example, the supply valve 6a is opened, then at the same time the supply valve 6b is closed so that the effluent supplied for purification reaches only the right-hand tank 7a of the three tank unit. Rotary surface aerators 9a and 9c in the tanks 7a and 8 arranged in this mode of plant operation to act as activating tanks are rotated simultaneously by respective drive motors 10. Rotation of the aerators 9a and 9c causes air or air enriched by pure oxygen to be mixed with the effluent in tanks 7a and 8. The rotary surface aerator 9b in tank 7b acting as a post-clarification tank is at rest. A discharge arrangement 11b associated with tank 7b is opened whilst a discharge arrangement 11a associated with tank 7a is closed. Discharge pipes of the discharge arrangements 11a and 11b extending at right angles through the tanks 7a or 7b are so arranged below the level of the liquid that no floating material finds its way into these discharge openings.

Effluent being treated passes generally through tanks 7a and 8 where it is aerated by means of the aerators 9a and 9c and through tank 7b via respective openings 13 between the tanks 7a, 8 and 7b. In tank 7b, aerated sludge in the effluent settles out onto the floor of tank 7b over the area thereof. Thus, a post-clarification of the effluent takes place. Since, in the tank 8, the effluent is in a turbulent condition and a smooth uniform flow through tank 7b is required to effect post-clarification on opposite sides of a wall 12 separating tanks 8 and 7b there are provided flow baffles 14 and 15 respectively. Each baffle 14, 15 is secured to the wall 12 above the openings 13 over the entire width of the tank 8, 7b and projects downwardly in inclined relationship to the wall 12. This baffle arrangement produces a very smooth uniform flow in the post-clarification tank 7b. The openings 13 between tank 7a and 8 are provided with similar baffles. Clarified and biologically purified effluent liquor leaves tank 7b by way of the discharge arrangement 11b and a discharge duct 16.

Since in the above described process, activated sludge is constantly displaced from both the first tanks 7a and 8 into the tank 7b and is not returned, the concentration of activated sludge in the tanks 7a and 8 decreases as the process continues. Below a predetermined concentration of activated sludge, a heavy reduction in the purification capacity takes place. Furthermore, no more oxygen is added to the activated sludge deposited in tank 7b so that, in this tank also, after a predetermined operation time results would be noticeable.

In order to avoid the aforementioned results and to ensure an acceptable purification capacity, the direction of operation of the three tank unit is reversed after a predetermined time and, before the concentration of the activated sludge in both the first tanks 7a and 8 has dropped to a predetermined value. In the course of this changeover, which takes place fully automatically, the rotary surface aerator 9a in the first tank 7a is next switched off, the outlet arrangement 11b is closed and the remote controlled supply valve 6b is opened. The rotary surface aerator 9c in the middle tank 8 can remain in operation. After the rotary surface aerator 9a has stopped, the liquid in the tank 7a becomes calm and any activated sludge therein settles on the floor of tank 7a. Settling of the activated sludge in tank 7a is monitored by a photo-electric cell device 17 situated at a predetermined distance below the outlet arrangement 11a. The device 17 is arranged to pass a control pulse, when the sludge is sufficiently settled, to open the outlet arrangement 11a, whereby the draining of water from tank 7a is effected. At the same time, the rotary surface aerator 9b in tank 7b is switched on and consequently the sludge deposited in this tank 7b is brought into the required state of suspension and supplied with oxygen. In this manner, effluent treatment occurs in the reverse direction through the three tank unit. The tank 7b is similarly provided with another device 17 for opening outlet arrangement 11b to start effluent treatment in the forward direction.

For drainage of the excess sludge, there is provided in the middle tank 8 an excess sludge pipeline 18 through which excess sludge is withdrawn and taken to a sludge concentrating and accumulating tank 19. The sludge from tank 19 is removed by a sludge removing device 20.

The plant can of course, as is indicated in FIG. 2 by dotted lines, be constructed symmetrically to double the capacity.

The rotary surface aerators 9a and 9b arranged to operate intermittently in the tanks 7a and 7b depending upon the direction of effluent flow are so dimensioned and designed that, in their operation directly over the floors of these tanks, a flow rate of at least 30 centimeters per second is produced in order to bring settled activated sludge back into a state of suspension.

It is, of course, also possible to seal the tops of the tanks 7a, 7b and 8 hermetically and, in operation, supply oxygen or oxygen enriched air into the space formed above the level of the effluent over pipelines.

To increase biological activation, it is possible for the temperature of the effluent in the activation tank, to be raised by at least 2° C., preferably by 5°-10° C., over the temperature of effluent entering the plant. Such heating may be effected by means of a heat exchanger through which hot water is circulated. Such hot water may be used cooling water from an atomic reactor. Alternatively, waste heat from a sludge concentration plant may be employed.

In order to avoid the provision of rotary aerators in all three tanks 7a, 7b and 8, it is possible, as can be seen from FIG. 4, to attach to a movable support above the tanks 7a, 7b and 8 two rotary aerators 23 and 24, e.g., two double-sided centrifugal pump impellers for introducing air, oxygenated air or pure air into the effluent to be cleared are used. Such centrifugal pump impellers 23 and 24 are especially useful in the case of deep tanks of, for example 6 to 12 meters deep, whereby in each of the tanks in which they are installed they form two main rotary flows superimposed on each other and in doing so thoroughly agitate the entire contents of the tank and rapidly bring the settled activated sludge into the required state of suspension. Pipelines (indicated by dotted lines 25) for the supply of pure oxygen or oxygen mixture into the effluent to be clarified, extend as far as an inlet zone of the aeration turbines 23 and 24.

In order to obtain a vortex-free flow of effluent in both the inlet openings of the rotary aerators 23, 24 viewed in the axial direction, in front of these inlet openings there are provided cruciformly arranged upper and lower flow baffles 26 and 27, respectively. The upper baffles 26 are attached to the movable support and the lower flow baffles 27 are attached to the floors of the tank 7a, 8 and 7b.

If now the direction of operation of the plant shown in FIG. 4 is changed so that the tank 7b operates as the activation tank, and tank 7a as the post-clarification tank, openings 28 in walls between the tanks 7a, 8 and 7b are exposed by laterally moving slides 29 which normally close openings 28. Then the rotary aerators 23 and 24 are moved by moving the movable support to the left as viewed in FIG. 4 until aerator 24 is disposed in the tank 7b and aerator 23 is disposed in tank 8. Finally, the openings 28 are closed by slides 29.

The control of the supply valve and the outlet arrangement for the operation of the plant takes place in a similar manner to that described with reference to FIGS. 1 to 3 and need not therefore be described more closely.

If pure oxygen or oxygenated air is to be supplied, such supply is via a supply pipe 25 and the tops of tanks 7a, 7b, and 8 are sealed so that the excess oxygen reaching the surface of the effluent can be removed from the space above the liquid and recycled.

I claim:

1. An activated sludge wastewater treatment process comprising:
    (a) providing a first tank, an intermediate tank and a final tank;
    (b) serially hydraulically interconnecting the tanks below normal wastewater surface level therein;
    (c) feeding wastewater to be treated into said first tank;
    (d) aerating the contents of said first tank and said intermediate tank so as to maintain activated sludge present and in suspension in said first tank and intermediate tank;
    (e) flowing aerated wastewater from said first tank serially through said intermediate tank to said final tank, so that during the course of treatment activated sludge continuously declines in concentration in said first tank and intermediate tank and continually increases in concentration in said final tank;
    (f) settling sludge from the wastewater in said final tank;
    (g) removing sludge-depleted wastewater from the final tank as treated effluent from the process;
    (h) discontinuing said feeding of wastewater into the first tank, the aeration of said first tank contents and the removal of treated wastewater from said final tank when the concentration of activated sludge in said first tank has been reduced to a first predetermined value;
    (i) feeding wastewater to be treated into said final tank while continuing the aeration of the intermediate tank contents but without removal of wastewater from any of said tanks during a time sufficient to permit settling of activated sludge in said first tank;
    (j) when activated sludge in said first tank has settled to a predetermined extent, initiating aerating of the contents of the final tank, with the aeration of the intermediate tank continuing, so as to maintain activated sludge present and in suspension in said final tank and intermediate tank;
    (k) flowing aerated wastewater from said final tank serially through said intermediate tank to the first tank, so that during the course of treatment activated sludge continuously declines in concentration in said final tank and intermediate tank and continually increases in concentration in said first tank;
    (l) settling sludge from wastewater in said first tank;
    (m) removing sludge-depleted wastewater from the first tank as treated effluent from the process;
    (n) discontinuing the feed of wastewater into the final tank, the aeration of said final tank contents and the removal of treated wastewater from the first tank when the concentration of activated sludge in said final tank has been reduced to a second predetermined value;
    (o) feeding wastewater to be treated into said first tank while continuing the aeration of the intermediate tank contents but without removal of wastewater from any of said tanks during a time sufficient to permit settling of activated sludge in said final tank;
    (p) reinitiating aerating of the contents of the first tank while continuing the aeration of the second tank contents so as to maintain activated sludge present and in suspension in said first tank and intermediate tank;
    (q) thereafter repeating steps (e) to (p) in sequence.

2. An activated sludge wastewater treatment process according to claim 1 comprising providing said first tank, intermediate tank, and final tank as tanks of the same size, joined to one another in sequence in an integral construction such that a common wall is provided between said first tank and said intermediate tank and a common wall is provided between said intermediate tank and said final tank.

3. An activated sludge wastewater treatment system comprising a first tank, an intermediate tank, and a final tank, passage means for serially hydraulically interconnecting the tanks below normal wastewater surface level therein, inlet means for selectively feeding wastewater to be treated into either of said first or final tanks, outlet means for selectively removing treated water from either of said first or final tanks, a translatable aerator assembly including support means to which are joined aerators disposed in two adjacent tanks including said intermediate tank and one of said first or final tanks, and movable wall means between said intermediate tank and each of said first and final tanks allowing movement of said aerator assembly to transfer each of the aerators from the tank in which it was previously disposed to an adjacent tank so that the first and final tanks may be functionally switched between aeration and clarification operations upon translation of said aerator assembly.

* * * * *